May 4, 1971     C. W. DESAULNIERS     3,577,508

COATING AND LAMINATING PROCESS

Original Filed Oct. 17, 1966

Charles W. Desaulniers
INVENTOR

By Kenneth E. Prince

Att'y

United States Patent Office 3,577,508
Patented May 4, 1971

3,577,508
COATING AND LAMINATING PROCESS
Charles W. Desaulniers, Franklin, Mass., assignor to
W. R. Grace & Co., New York, N.Y.
Original application Oct. 17, 1966, Ser. No. 587,194, now
Patent No. 3,499,820, dated Mar. 10, 1970. Divided
and this application July 15, 1969, Ser. No. 869,414
Int. Cl. B32b 19/02; B44d 1/14
U.S. Cl. 264—331                              10 Claims

ABSTRACT OF THE DISCLOSURE

A process for preparing a self-supporting laminate having a low permeability to gases, comprising applying a coating of a film-forming polymer-diluent system to a substrate; adjusting the thickness of the coating; drying the coating to a solid state; applying a coating of a dispersion of a mineral, inorganic, or organic filler having a platelike structure to the resulting film; adjusting the thickness of the coating of filler; applying at least one coating or the film-forming polymer-diluent system to the dried coating of filler; adjusting the thickness of the coating of film-forming diluent system; and drying the coating of film-forming diluent system.

CROSS REFERENCE TO RELATED APPLICATION

Figure 1:
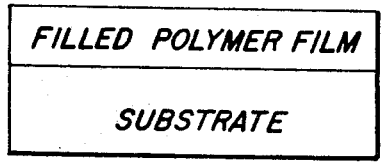

This is a divisional of application Ser. No. 587,194, filed Oct. 17, 1966, now U.S. Pat. No. 3,499,820.

This invention relates to a novel and useful coating and laminating process. More particularly, it relates to a coating and laminating process whereby a film having an exceptionally low permeability to gases including oxygen, nitrogen, water vapor, carbon dioxide, and the like is prepared.

It is an object of this invention to prepare a self-supporting laminate (see FIG. 1) having a low permeability to gases by a process comprising applying at least one coating of a filled film-forming polymer-diluent system selected from the group consisting of dispersions and solutions to a substrate, and, after applying each such coating, adjusting the thickness of the coating, and drying the coating to a solid state, whereby a film is formed, the film being laminated to the substrate. The substrate and film can be separated to yield a self-supporting film having a low permeability to gases.

It is an object of this invention to prepare a self-supporting laminate (see FIG. 2) having a low permeability to gases by a process comprising applying at least one coating of a filled film-forming polymer-diluent system selected from the group consisting of dispersions and solutions to a substrate, and, after applying each such coating, adjusting the thickness of the coating, drying the coating to a solid state, whereby a film is formed, the film being laminated to the substrate, applying at least one coating of a film-forming polymer-diluent system selected from the group consisting of dispersions and solutions to the aforesaid film, and, after applying each such coating, adjusting the thickness of said coating of film-forming polymer-diluent system, and drying said coating of film-forming polymer-diluent system to the solid state, whereby a second film is formed, said second film being laminated to the film prepared from the aforesaid filled film-forming polymer-diluent system. The substrate and film can be separated to yield a self-supporting laminate film (see FIG. 3) having a low permeability to gases.

It is an object of this invention to prepare a self-supporting laminate (see FIG. 4) having a low permeability to gases by a process comprising applying at least one coating of a film-forming polymer-diluent system selected from the group consisting of dispersions and solutions to a substrate, and, after applying each such coating, adjusting the thickness of the coating, drying the coating to a solid state, whereby a film is formed, said film being laminated to the substrate, applying a coating of a dispersion of filler to the film, adjusting the thickness of the coating of filler, drying the coating of filler to a substantially liquid free state, whereby a layer of filler is formed on the first film, said layer of filler being on top of and laminated to the film, applying at least one coating of the film-forming polymer-diluent system selected from the group consisting of dispersions and solutions to said layer of filler, and, after applying each such coating, adjusting the thickness of said coating, and drying said coating to the solid state, whereby a film is formed, said second film being on top of and bonded to the layer of filler. The substrate and film can be separated to yield a self-supporting laminate film (see FIG. 5) having a low permeability to gases. It is also an object of this invention to increase the flexibility of the layer of filler by preparing it from a dispersion containing about 0.5–15%, based on the dry weight of the filler present, of a polymeric additive selected from the group consisting of polyvinyl methyl ether and polyethylene oxide.

It is an object of this invention to prepare a self-supporting laminate (see FIG. 4) having a low permeability to gases by a process comprising applying at least one coating of a film-forming polymer-diluent system selected from the group consisting of dispersions and solutions to a substrate, and, after applying each such coating, adjusting the thickness of the coating, drying the coating to a solid state, whereby a film is formed, said film being laminated to the substrate, applying a coating of a dispersion of a purified clay-like mineral having a platelike structure as defined infra to the film, adjusting the thickness of the coating of clay-like mineral, drying the coating of clay-like mineral to a substantially liquid free state, whereby a layer of clay-like mineral is formed on top of said film, said layer being laminated to said film, applying a coating of a solution of at least one salt of at least one element selected from the group consisting of aluminum and the transition elements to said layer of clay-like mineral, allowing the coating of said solution to remain in contact with the mineral layer for about 5 seconds to about 10 minutes, thereby to modify said mineral layer, washing said solution from the modified mineral layer, drying the modified mineral layer to a substantially liquid free state, applying at least one coating of said film-forming polymer-diluent system to the thus washed and dried modified mineral layer, and after applying each such coating, adjusting the thickness of said coating, and drying said coating to a solid state, whereby a film is formed, said film being on top of and laminated to the layer of modified clay-like mineral. The substrate and film can be separated to yield a self-supporting laminate film (see FIG. 5) having a low permeability to gases. It is also an object of this invention to increase the flexibility of the layer of filler by preparing it from a dispersion containing about 0.5–15%, based on the dry weight of filler present, of a polymeric additive selected from the group consisting of polyvinyl methyl ether, polyethylene oxide, and the like.

It is an object of this invention to prepare a self-supporting laminate (see FIG. 6) having a low permeability to gases comprising applying at least one coating of a film-forming polymer-diluent system selected from the group consisting of dispersions and solutions to a substrate, and after applying each such coating, adjusting the thickness of the coating, drying the coating to a solid state, whereby film of polymer is formed, said film being laminated to the substrate, applying at least one coating of a filled film-forming polymer-diluent system consisting of dispersions and solutions to said first film, and, after applying each such coating, adjusting the thickness of the coating of filled polymer-diluent system, drying the coating of filled polymer-diluent system to the solid state, whereby a film of filled polymer is formed, said film being on top of an laminated to the aforesaid film of polymer, applying at least one coating of a film-forming polymer-diluent system selected from the group consisting of dispersions and solutions to the film of filled polymer, and, after applying each such coating, adjusting the thickness of the coating of film-forming polymer-diluent system, and drying the coating of polymer-diluent system to a solid state, whereby a film of polymer is formed, said film being on top of and laminated to the film of filled polymer. The substrate and film can be separated to yield a self-supporting laminate film (see FIG. 7) having a low permeability to gases.

It is an object of this invention to provide a process for coating various substrates with a polymer film composition having a low permeability to gases such as oxygen, air, nitrogen, carbon dioxide, water vapor and the like. It is an object of this invention to provide a process for forming a laminate in situ from a film-forming polymer-diluent system selected from the group consisting of solutions and dispersions (including emulsions, suspensions, and latexes) of film-forming polymers. It is an object of this invention to prepare polymer films having greatly reduced permeability to gases such as air, oxygen, nitrogen, water vapor, carbon dioxide, and the like from polymer-diluent systems including latexes. It is another object of this invention to prepare a transparent glass-clear laminated film from polymer-diluent systems. It is another object of this invention to prepare films for use in packaging foods and other materials which should (or must) be protected from contact with the atmosphere. It is still another object of this invention to prepare glass-clear transparent laminate films from polymer-diluent systems prepared from film-forming polymers, whereby the resulting films have extremely low permeability to gases including oxygen, air, water vapor, carbon dioxide, and the like.

Substrates with which I have used with excellent results in the process of this invention include glass surfaces, metal surfaces including an endless metal belt, wooden surfaces, aluminum foil, tin foil, plastic films and sheets— including films made of cellulose acetate, cellulose propionate, cellulose butyrate, polyamides, polycarbonates, polyesters, polyethylene, corona treated polyethylenes, polypropylene, and polystyrene—other suitable substrates including paper, paperboard, wallboard, cloth, canvas, wood, and the like.

Figure 2:
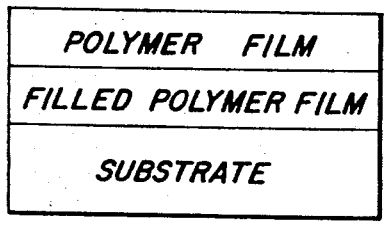
Figure 3:
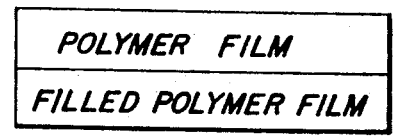

This invention is also directed to an article of manufacture comprising an self-supporting laminate having a low permeability to gases, said laminate having a film of filled polymer, and a film of polymer bonded to the film of filled polymer (see FIG. 3); said article can be bonded to a substrate (see FIG. 2).

Figure 4:
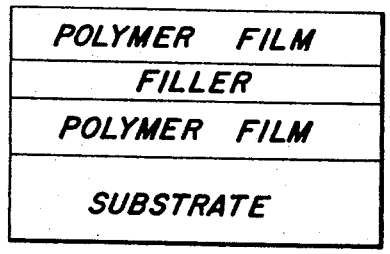
Figure 5:
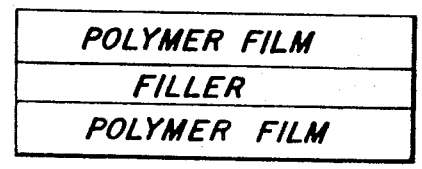

This invention is also directed to an article of manufacture comprising a self-supporting laminate having a low permeability to gases, said laminate having a first film of polymer, a film of filler bonded to the first film of polymer, and a second film of polymer bonded to the film of filler (see FIG. 5); said article can be bonded to substrate (see FIG. 4).

This invention is also directed to an article of manufacture comprising a self-supporting laminate having a low permeability to gases, said laminate having a substrate, and a film of filled polymer bonded to the substrate (see FIG. 1).

This invention is also directed to an article of manufacture comprising a self-supporting film of filled polymer, said film having a low permeability to gases.

Figure 6:
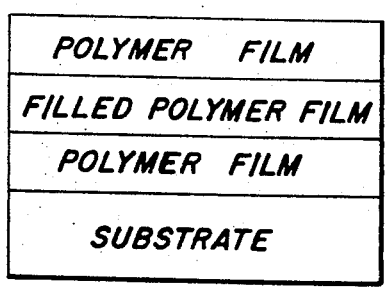
Figure 7:
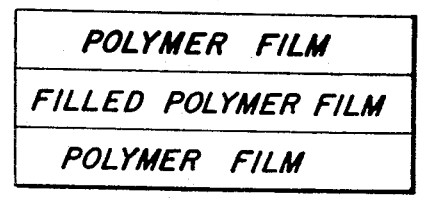

This invention is also directed to an article of manufacture comprising a self-supporting laminate having a low permeability to gases, said laminate having a first film of polymer, a film of filled polymer bonded to the first film, and a second film of polymer bonded to the film of filled polymer (see FIG. 7); said article can be bonded to a substrate (see FIG. 6).

This invention is also directed to an article of manufacture comprising a self-supporting laminate film having a low permeability to gases, said laminate having a first film of polymer, a film of filler bonded to the first film of polymer and a second film of polymer bonded to the film of filler in which the filler contains about 0.5–15% (preferably 1–4%), based on the dry weight of the filler, of a polymeric additive selected from the group consisting of polyvinyl methyl ether, polyethylene oxide, and the like, to increase the flexibility of the laminate (see FIG. 5); said article can be bonded to a substrate (see FIG. 4).

In the drawing:

The drawing illustrates the laminates of this invention.

In one embodiment of my invention I strip a film which was formed by my process from the surface (e.g., polished glass surface, polished metal surface, or substrate, such as a rotating drum or endless belt, or the like) on which the film was prepared, thereby to obtain a substantially clear transparent film which is substantially impervious to gases including oxygen, nitrogen, air, water vapor, carbon dioxide, and the like. In another embodiment of my invention, I leave the film on the substrate, or surface, or base, or support, on which it was formed (e.g., a base which can be another plastic film—e.g., polyethylene, corona treated polyethylene, polypropylene, other polyolefins, and the like—wood, paperboard, metal foil, paper, cloth, or the like), thereby to form a laminate comprising the thus formed film bonded to the base or substrate on which said film was formed.

In one embodiment of this invention I coat, or precoat, the substrate with a primer, to faciliate bonding between the substrate and the film formed thereon, before applying a coating of a polymer-diluent system to said substrate. Hercoprime (an atactic polypropylene in an aromatic solvent) is a preferred primer. Other primers will be readily apparent to those skilled in the art.

My invention fills a long standing need and is entirely unobvious and completely unexpected. Packaging films in general exhibit substantial permeability to oxygen and other gases, including water vapor, present in the atmosphere. For example, the permeability of polyethylene film to oxygen is about $1.04 \times 10^{-8}$ cc. (s.t.p.)$\times$cm./cm$^2\times$sec.$\times$atm. at 35° C. while the permeability film comprising a copolymer of vinylidene chloride and acrylonitrile to oxygen was found to be about $1.8 \times 10^{-11}$ cc. (s.t.p.)$\times$cm./cm.$^2\times$sec.$\times$atm. at 35° C.

I have found that substantially any substance—mineral, inorganic, or organic—existing in the form of platelets or particles having a platelike structure (i.e., existing in the form of platelets having an axial ratio of about 20–300:1 and a maximum length of about 20–30 microns), being substantially insoluble in the polymer-diluent system to which it is added or brought into contact in the process of this invention and being substantially resistant to the hydrating and disintegrating action of water—including water vapor—can be used with excellent results as a "filler" in the process of my invention. By the term "filler," I mean at least one substance having a platelike structure selected from the group consisting of mineral, inorganic, and organic materials which, where incorporated into a polymer-diluent system comprising solutions and dispersions (including emulsions and latexes) of film-forming polymers render films made therefrom substantially nonpermeable to gases such as oxygen, nitrogen, air, water vapor, carbon dioxide, and the like; said substance, where mineral, can be a naturally occurring mineral, a synthetic mineral, or a chemically modified mineral. By the term filler I also mean at least one substance selected from the aforesaid materials which, where present as a layer laminated, or bonded, between at least two layers of film formed from such polymer-diluent systems, renders such laminate substantially nonpermeable to gases including those listed supra.

By the term "filled film-forming polymer-diluent system," I mean a polymer-diluent system to which about 5–95% (based on the total weight of the system), of filler as defined supra, has been added. Examples of such substances (fillers) include graphite platelets, platelets of metals such as aluminum, platelets of alloys such as bronze, and organic substances having a platelike structure and being substantially insoluble in the polymer-diluent system (e.g., N-benzoyl acetamide where water is the diluent), and the like. Numerous other examples of inorganic and organic substances suitable for use in the process of this invention will be readily apparent to those skilled in the art. I have also found that minerals having the above-defined platelike structure (e.g., platy clays, mica, vermiculite, platy talc, and the like) are generally too susceptible to the hydrating and disintegrating action of water vapor present in the atmosphere to be satisfactory for use in the process of my invention. I have found that films prepared from such minerals have very low permeability to substantially dry gases. However, if such films are exposed to air having a high moisture content, such as is frequently encountered in the Mississippi Valley during the summer, the moisture present in such air permeates the films and substantially increases the air and oxygen permeability thereof. I have made the unobvious and completely unexpected discovery that this susceptibility to moisture can be eliminated by modifying such minerals (i.e., by treating them with ions selected from at least one member of the group consisting of aluminum (III) and positive ions of transition elements). By transition elements, I mean elements having atomic numbers 21–32, 39–51, and 57–83. I generally prefer to modify such minerals by treating them with iron (III), chromium (III), and zirconium (IV) ions. I have obtained optimum results with chromium (III) and zirconium (IV) ions.

I have found that there are three general methods by which the laminates of my invention can be prepared, these are:

FIRST GENERAL METHOD

To a polymer-diluent system prepared from a film-forming polymer and having a solid content of about 5–70%, I add a filler, which is insoluble in the polymer-diluent system, in such quantity as to form a polymer-diluent-filler system comprising about 5–95% filler. Said filler has a platelet or platelike shape and an axial ratio (length to thickness) of about 20–300:1 and a maximum length up to about 20–30 microns. I have obtained excellent results with such particles, e.g., 0.005–5 microns; I have also obtained optimum results with particles having a length of about 0.01–1 micron. Fillers having a platelike structure and which I have found to give excellent results in the process of my invention include vermiculite, mica, talc having a platelet or platelike structure (that having a fibrous structure is unsatisfactory), graphite, clays having a platelike structure (e.g., bentonite), aluminum platelets, bronze platelets, and platelets of water insoluble organic compounds such as N-benzoyl acetamide, and similar materials. However, where using clay-like minerals (i.e., vermiculite, mica, talc, clays, and the like having a platelike structure) as fillers for laminates, including laminate films, I have found that the permeability to humid, or moist, air of such laminates can be greatly decreased by modifying said fillers. As used herein the term "modifying" clay-like minerals means to treat said minerals with at least one salt of at least one element selected from the group consisting of aluminum and the transition elements, whereby the permeability to humid air of laminates filled with the thus treated minerals is substantially less than that of similar laminates filled with the same minerals which have not been treated with at least one salt of aluminum or a transition element. The term "modified clay-like fillers" means clay-like minerals which have been subjected to the above-mentioned modifying treatment.

Since commercially available clay-like minerals contain impurities (such as silica, particles of rock, and some very large particles of clay-like minerals), I have found that such minerals should be refined before using them in the process of my invention. Although many ways to accomplish such refining will be readily apparent to those skilled in the art, I prefer to do this by forming a suspension of about 0.1–10% of the clay-like mineral (preferably about 2%) in water, agitating the resulting mixture vigorously, and adding a small amount (0.1–5% based on the weight of the clay-like mineral present) of a dispersing and exfoliating agent such as sodium polyphosphate, sodium hydroxide, sodium carbonate, sodium oxalate, sodium phosphate, or the like to the resulting slurry, thereby to disperse and exfoliate the clay-like mineral. After thorough mixing I separate, for example by centrifuging or by decanting, the resulting dispersion (or slurry) from the few remaining large particles (including a small quantity of mineral which was not exfoliated).

The dispersion is now ready for treatment with a solution of at least one salt of aluminum or a transition element, whereby the properties of the filler (especially its resistance to water vapor) are improved. I prefer to conduct such treatment by adding to the dispersion of clay-like mineral a solution of at least one salt of at least one element selected from the group consisting of aluminum and the transition elements, in which said element is present as a cation, while stirring the dispersion as the solution of said salt is added slowly thereto. The dispersion will take on a more and more flocculated character as the solution of said salt is added until flocculation is substantially complete. I then separate the clay-like mineral by a conventional method such as decantation, filtration, or centrifugation, and I wash the thus separated clay-like material to remove any salts and other impurities which are present in the mother liquor or adhering to the clay-like mineral.

In another embodiment of this invention I treat the clay-like mineral with at least one ion selected from the group consisting of ions of aluminum and the transition elements by passing a dispersion, or slurry, of said mineral through an ion exchange column which has been prepared by passing a concentrated aqueous solution of at least one salt of at least one element selected from the group consisting of aluminum and the transition elements in which the aluminum or transition element is present as a cation through a column packed with a conventional hydrogen form of an ion exchange resin. For example, a solution of chromium chloride can be passed through a column containing a conventional ion exchange resin in the hydrogen form, thereby to convert said resin from the hydrogen form to the chromium form. The dispersion of clay-like mineral is then passed through the ion exchange resin, and the thus treated clay-like mineral is recovered and washed. I have found that passing the dispersion of clay-like mineral through a resin bed at a rate of about 0.005–0.3 bed volume per minute gives excellent results. I then separate and wash the resulting modified clay-like mineral and redisperse the thus washed modified clay-like mineral to make a slurry suitable for use as a filler in the process of my invention. Where using graphite, aluminum platelets, bronze platelets, or similar metal platelets, and platelike organic materials it is not necessary to treat said graphite, or metal, or organic platelets with a compound of aluminum or a transition element. Where using such materials, I make a dispersion, or suspension, or slurry of the platelets by adding said platelets to water, agitating the mixture and then separating, by decantation or centrifugation, any large particles which might be present. The resulting slurry is then ready for use in the process of my invention.

Where using a modified clay-like mineral as filler in a polymer-diluent system where the addition of water will not produce harmful results (e.g., the coagulation or precipitation of the polymer, the formation of two liquid phases, or the excessive dilution of the resulting polymer-diluent-filler system), an aqueous dispersion (containing about 0.5–8% solids, preferably about 2–5% solids) of the modified mineral in water can be added to a film-forming polymer-diluent system. Where water would be harmful, the modified clay-like mineral is recovered from the dispersion in which it was prepared and dried. The thus dried modified clay-like mineral filler is then added to the polymer-diluent system to yield a polymer-diluent-filler system.

As stated supra, I use a polymer-diluent system containing about 5–70% solids. To this I add sufficient filler having a platelike structure, or shape, to produce a polymer-diluent-filler system in which the filler constitutes 5–95% of the weight of said polymer-diluent-filler system.

I prepare a laminate by applying at least one coating of the film-forming polymer-diluent-filler system to a substrate or surface and draw the wet (i.e., diluent-containing) coating to the desired thickness with conventional apparatus (e.g., a Meyer Bar, Baker Film Applicator Bar, doctor bar, or the like) in a conventional manner. I prefer to draw each wet coating to such thickness that on drying it will yield a film of filled polymer (bonded to the substrate) about 0.5–3 mils thick (1 mil is 0.001 inch). I then dry said first coating at such a temperature that the "moisture" (i.e., diluent) will be evaporated from the film but that the polymer will not be burned, charred, or otherwise decomposed by heat, thereby to form a laminate which is substantially nonpermeable to gases such as air, oxygen, nitrogen, water vapor, carbon dioxide, and the like, said laminate comprising a film of filled polymer laminated, or bonded, to said substrate, or surface. Said film can, if desired, be stripped from said surface if said surface is a smooth surface such as polished glass, smooth metal, and the like.

The drying temperature will obviously depend upon the type of polymer from which the polymer-diluent system was made, upon the boiling point and vapor pressure of the diluent, and upon the residence time in the drying oven (or drying or heating zone). I have found that temperatures ranging from about 100 to about 140° C. have given excellent results; however, temperatures considerably lower than this and temperatures a great deal higher—particularly where using short residence time in the heating zone—have also been used with excellent results. In some instances, e.g., to fill pinholes formed in the filled polymer film bonded to the substrate, I add a second coating of the aforesaid polymer-diluent-filler. I draw the second coating down and dry it according to the procedure used with the first coating. I usually make the second film about the same thickness as the first; however, it can be thinner or thicker as choice dictates. I can, if desired, add additional, i.e., a third, fourth, fifth, etc. coating—after drawing down and drying each underlaying coating. I can, if desired, strip the thus formed film from the substrate, or support on which it was formed and recover a laminate film comprising the aforesaid first film and the aforesaid second film laminated, or bonded, together. Alternatively, I can leave the resulting film laminated to the substrate—especially where the substrate is paper, paperboard, cloth, wood, or plastic film.

SECOND GENERAL METHOD

In another embodiment of my invention I do not add filler having a plate-like structure to the film-forming polymer-diluent system. Instead, I modify the general procedure described supra by using a polymer-diluent system to which no filler has been added. Said polymer-diluent system is of the type described supra and has a polymer content of about 5–70%. I coat a substrate (e.g., a substrate of the type mentioned supra) with the polymer-diluent system and draw the resulting wet coating to a thickness which will yield a first polymer film, or first polymer layer, of about 0.05–3 mil dry thickness, and dry said wet coating. In some instances after drying this coating I prefer to apply a second coating, or layer, of the polymer-diluent system on top of the thus prepared first dry film, or dry layer. The resulting second layer, or second film, can have a dry thickness about the same as, or thicker, or thinner than that of the first layer. After drying the first layer (or the second or subsequent, i.e., third, fourth, etc., layer where a second or subsequent layer is used) I coat the thus dried film with a dispersion of filler (e.g., modified clay-like mineral, graphite, or metal platelets, or platelets of an organic material, said filler being substantially insoluble in the polymer-diluent system). (Where only one layer of the polymer-diluent system is used, I coat said layer with said dispersion of filler.) Said filler is dispersed in a medium in which the filler and the polymer are substantially insoluble. I prefer to draw the coating of said filler down to such wet thickness that where dry it will have a thickness of about 0.005–0.2 mil. I then dry this wet coating, or film, under such conditions that will render it substantially dry but under conditions of temperature that will *not* burn or otherwise damage the polymer or the filler. I have found that temperatures of about 100 to about 140° C. give excellent results; however, I have also obtained excellent results with higher and lower temperatures depending upon the residence time of the film in the heated zone and on the vapor pressure of the medium being evaporated. Subsequently, I apply a coating of the polymer-diluent system and draw it to such thickness that it will yield a film having a dry thickness of 0.05–3 mil on top of the thus dried coating of filler. I dry this coating until it is substantially free of diluent but under such conditions that neither the polymer nor the filler is burned, charred, or otherwise damaged by the drying process. In some instances, I prefer to put a second coating, or layer, of the polymer-diluent system upon the coating, or layer, which I have previously applied and dried on top of the coating of plate-like filler. Where applying such additional coating of polymer-diluent system, said coating may be the same thickness as the previous coating or it may be thicker or thinner. If desired, a third, fourth, fifth, etc. coating of the polymer-diluent system can be applied and drawn down and dried in the usual manner.

THIRD GENERAL METHOD

In still another embodiment of my invention I prefer to use the general method outlined in the Second General Method, supra, except that I use a slurry of clay-like mineral which has not been modified by treating with a salt of aluminum or at least one element of the transition group. Where using this procedure one or two coatings of the polymer-diluent system are applied, drawn down, and dried as before and a coating of a suspension of clay-like mineral which has not been modified by treatment with a salt of aluminum or a transition group element is applied on top of the thus prepared polymer film; said coating is drawn down to produce a film which will have a dry thickness of about 0.005–0.2 mil. This material is then dried and treated with a solution of a salt of aluminum or a transition element, washed with water, dried, and coated with one or two layers of polymer film using the general procedure outlined where discussing the Second General Method, supra.

Diluents which I have found to be especially useful in the process of my invention include: water, tetrahydrofuran, carbon tetrachloride, ethylene dichloride, methanol, ethanol, isopropyl alcohol, toluene, xylene, acetonitrile, hexane, heptane, dimethyl formamide, and dimethyl sulfoxide. Other diluents will, on the basis of the disclosures presented in this patent application, be readily apparent to those skilled in the art.

Film-forming polymers with which I have obtained excellent results include homopolymers of vinyl chloride, copolymers of vinylidene chlorides with monomers selected from the group consisting of methyl acrylate, ethyl acrylate, acrylamide, and acrylonitrile, homopolymers of vinyl acetate and copolymers of vinyl acetate with monomers selected from the group consisting of methyl acrylate, ethyl acrylate, acrylamide, and acrylonitrile. I have also obtained excellent results using copolymers in which polyvinyl chloride was the principal constituent. Where using copolymers of vinylidene chloride, I prefer to use those in which polyvinylidene chloride constitutes the major component; however, I have obtained excellent results with copolymers of vinylidene chloride in which the vinylidene chloride is not the major component. Where using the copolymers of vinyl acetate, I prefer to use those in which polyvinyl acetate is the major component; however, I have obtained excellent results with such copolymers in which the polyvinyl acetate was not a major component.

Numerous other polymers and copolymers which will give excellent results in the process of my invention will, as a consequence of the disclosures contained herein, be readily apparent to those skilled in the art.

I have obtained excellent results where using aqueous dispersions of film-forming polymers, i.e., film-forming latexes, in the process of my invention. Excellent results have been obtained with such latexes in which the polymer particles have diameters ranging from about 200 A. (Angstrom units) to about 100,000 A.; however, I prefer to use polymer particles ranging in diameter from about 700 A. to about 4,500 A.

As a consequence of the disclosures presented herein, numerous modifications of the procedures and embodiments of my invention will be readily apparent to those skilled in the art.

I prefer to measure the permeability of films to gases and vapors with a device known as an Amicon Permeameter. Said device measures the rate of change of pressure in a previously evacuated space, of known volume, downstream of the film whose permeability is being measured. Said film is positioned between two sections of a permeability cell; said cell is closed and sealed by bolting two out flanges together. The sealed cell is attached to a vacuum line, attached to a vacuum pump, and evacuated to a pressure of $1 \times 10^{-4}$ mm. of mercury. After allowing sufficient time for outgassing, oxygen, or other gas or vapor, is admitted at a pressure of about 500 mm. of mercury to the portion of the cell which is upstream of said film. The portion of the cell which is downstream of the film is then disconnected from the vacuum line; and the rate of change in pressure of said downstream portion of said cell is recorded using a conventional differential pressure sensor. Said pressure sensor records pressure changes as low as 0.01 micron per minute. Permeability is calculated from the slope of a curve obtained by plotting downstream pressure vs. time in minutes. Other procedures for measuring the permeability of films will be readily apparent to those skilled in the art.

My invention will be further illustrated by the following examples which are illustrative only and which are not intended to limit the scope of the invention.

EXAMPLE I

A suspension of about 2% of bentonite clay in water at about 60° C. was agitated with rapid stirring and treated with sodium polyphosphate as a dispersing and exfoliating agent. About 0.5% sodium polyphosphate, based on the weight of the clay present, was added. When dispersion was substantially complete, after about 2 hours, stirring was discontinued and a small amount of larger unexfoliated clay particles and a few particles of rock, silica, and the like were allowed to settle out. The dispersion was decanted from the particles which had settled, thereby to obtain a dispersion of a purified clay-like material—purified bentonite clay. A one molar solution of chromium (III) chloride was slowly added to the suspension of purified clay while stirring said suspension. As the chromium salt was added, the clay flocculated slowly until flocculation of the clay was finally complete. The thus flocculated clay was separated from the supernatant liquor and washed with water, thereby to yield at modified clay suitable for use as a filler in the process of this invention. The thus washed modified clay was redispersed in an aqueous solution of sodium polyphosphate (about 0.5% sodium polyphosphate, based on the weight of the modified clay) and enough water to form a dispersion containing about 8% of the modified clay. The resulting dispersion of modified bentonite clay was labeled "Dispersion No. 1."

A latex (i.e., an aqueous dispersion) of a copolymer of vinylidene chloride and vinyl chloride having a solid content of about 40% was mixed with a sufficient quantity of the above-mentioned Dispersion No. 1 to produce a composition, or slurry, designated "Composition A," containing about 15% of said modified clay and 85% copolymer based on the solid content of the resulting slurry, or composition. After mixing the slurry thoroughly, a quantity of it was applied as a first coating to a smooth glass surface and drawn down with a Baker Film Applicator. The coating was drawn to such thickness that, after drying at about 125° C. for about 3 minutes, a first layer of a filled polymer film having a thickness of about 0.5 mil resulted. A second coating of the aforesaid Composition A, of substantially the same thickness as the aforesaid first coating, was applied to said first coating and dried using the same application, drawing, and drying procedure that was used with said first coating, thereby to fill pinholes in the first layer of polymer film and to produce a film having a total thickness of about 1 mil and consisting of a film of modified clay filled polymer laminated, or bonded to a substrate (the glass surface). This film was stripped from the glass surface.

The permeability of the dried transparent film to oxygen was measured and found to be less than $1 \times 10^{-12}$ cc. (s.t.p.)$\times$cm./cm.$^2\times$sec.$\times$atm. at 35° C.; this contrasts with a value of about $1 \times 10^{-11}$ cc. (s.t.p.)$\times$cm./cm.$^2\times$sec.$\times$atm.

at 35° C. for a film prepared from the same latex but without the addition of the chromium modified clay filler.

EXAMPLE II

The general procedure of Example I was repeated using the foresaid Composition A, but in this instance only one coating was applied to a glass surface, or substrate. Said coating was drawn, while wet, to such thickness that after drying for about 4 minutes at 120° C. it had a thickness of about 0.8 mil, thereby forming a laminate comprising said film laminated to the glass substrate. A portion of said film was stripped from the glass surface, and its (the film's) permeability to oxygen was determined and found to be less than $1 \times 10^{-12}$ cc. (s.t.p.)$\times$cm./cm.$^2\times$sec.$\times$atm. at 35° C.

EXAMPLE III

The general procedure of Example I was repeated, however, in this instance the clay used was bentonite which had been treated according to the general method of Example I except that zirconium (IV) chloride was used, in place of chromium (III) chloride, to treat the bentonite clay The results obtained in this example were substantially identical to those obtained in Example I.

EXAMPLE IV

A first polymer film was prepared by applying a first coating of a latex comprising a copolymer of vinylidene chloride and acrylonitrile having a solid content of about 55% on a smooth metal surface using a Baker Film Applicator Bar to draw the wet film down. This coating was dried at about 120° C. for about 5 minutes, thereby yielding a dry film, or layer, having a thickness of about 0.6 mil. A coating, or layer, of the dispersion of modified clay prepared in Example I, supra (i.e., Dispersion No. 1), was then applied on top of the thus dried film, drawn down with a Baker Film Applicator Bar, and dried at about 120° C. for about 5 minutes. The resulting layer of modified clay had a thickness of about 0.05 mil. A second coating, or layer, of the aforesaid latex was then applied on top of the dried clay coating, using the same procedure that was used where applying the aforesaid first coating, and dried at about 120° C. for about 5 minutes; the resulting dried laminate film had a total thickness of about 1.25 mil. Said film was stripped from the support (substrate) on which it was formed. The permeability of this laminate film to oxyen and humid air was less than $1 \times 10^{-12}$ cc. (s.t.p.) $\times$ cm./cm.$^2 \times$ sec. $\times$ atm. at 35° C.

EXAMPLE V

A first coating of a vinylidene chloride ethyl acrylate copolymer latex having a solid content of about 55% was applied to a polished metal surface using a Baker Film Applicator Bar to draw the coating down. The resulting wet film was dried at about 130° C. for about 3 minutes; it yielded a dry first film having a thickness of about 0.5 mil bonded to the metal surface.

A dispersion of bentonite clay filler was prepared by adding a sufficient amount of said clay to give a dispersion, or slurry, of about 10% solid content to water, stirring the mixture, and adding thereto sufficient sodium hydroxide to bring the pH to about 8–9, thereby to exfoliate and suspend the clay. The mixture was stirred until dispersion was substantially complete (ca. for about 1.5 hour). The dispersion was then separated (by centrifugation) from a small quantity of large particles, unexfoliated clay, silica, and the like, which had settled to the bottom. The thus separated dispersion was labeled "Dispersion No. 2."

A coating of Dispersion No. 2 was applied to the aforesaid first film using a Baker Film Applicator Bar to draw the wet coating down. The clay film was dried for about 3 minutes at about 130° C., thereby to give a film, or layer, of said filler about 0.04 mil thick. Said clay film was treated with an excess of a solution of about 0.1 molar chromium (III) sulfate for a period of about 10 minutes. The clay film swelled somewhat during this treatment but it retained its integrity. The excess chromium salt solution was flushed, or washed, from the film with water and the film was dried for about 3 minutes at about 130° C., thereby yielding a film of modified claylike material bonded to the aforesaid first film. A second coating of the aforesaid latex was applied to the thus dried chrominum-treated clay layer using a Baker Film Applicator Bar to draw the wet coating down. Said second coating was dried at about 130° C. for about 3 minutes, thereby yielding a film of latex having a thickness of about 0.5 mil on top of and bonded to the aforesaid clay layer. The resulting laminate film was stripped from the metal surface, or substrate, upon which it was formed.

The permeability to oxygen of said laminate film was less than $1 \times 10^{-12}$ cc. (s.t.p.) $\times$ cm./cm.$^2 \times$ sec. $\times$ atm. at 35° C.

EXAMPLE VI

The general procedure of Example V was repeated, but in this instance the dried clay coating, or film, was treated with a nearly saturated solution of zironium (IV) nitrate rather than with a solution of chromium sulfate. The results obtained in this example were substantially identical to those obtained in Example V.

EXAMPLE VII

The general procedure of Example V was repeated, but in this instance the dried clay coating, or film, was treated with a 0.5 molar solution of iron (III) chloride rather than with a solution of chromium sulfate. The results were substantially identical to those obtained in Example V.

EXAMPLE VIII

A copolymer of vinylidene chloride and vinyl chloride was dissolved in tetrahydrofuran to produce a solution containing about 10% of said copolymer. A first coating of this solution was applied to a paperboard surface, the wet coating was drawn down with a Baker Film Applicator Bar and the solvent was evaporated; the resulting film was dried for about 3 minutes at about 125° C., thereby to yield a dry first polymer film having a thickness of about 0.4 mil laminated to a substrate (the paperboard surface). A second coating of said solution of copolymer was applied in a similar fashion, the solvent was evaporated, and the film was dried as before. This resulted in the formation of a film having a total thickness of about 0.7 mil laminated to the paperboard surface. A slurry of chromium-treated bentonite filler, prepared by the general procedure of Example I, and containing about 3% solid was applied, as a coating, to the thus prepared polymer film. The coating of chromium-treated bentonite was drawn down and dried for about 3 minutes at about 125° C., thereby to form a film, or layer, of modified (chromium-treated) bentonite filler of about 0.04 mil on the previously prepared polymer film surface. Said modified bentonite clay film, or layer, was then overcoated with a coating (called the third coating) of the aforesaid polymer solution. Said coating of polymer solution was applied in the same fashion as the aforesaid first polymer coating. The solvent was evaporated, and the resulting third polymer film was dried for about 3 minutes at about 125° C.; the third film, or layer, of copolymer was overcoated with a fourth coating of the polymer solution in the same fashion that the aforesaid first polymer film was overcoated with the aforesaid second coating of polymer solution. The solvent was evaporated from the fourth polymer coating and the resulting film was dried at about 125° C. for about 3 minutes. The resulting laminate comprised a paperboard substrate laminated to a primary film of polymer, a film of filler (modified bentonite) laminated to the primary film of polymer, and a secondary film of polymer laminated to the film of filler. The primary and secondary films of polymer were each about 0.35 mil thick and the film of filler was about 0.04 mil thick. The resulting structure was substantially nonpermeable to gases including moisture-laden oxygen and humid air.

EXAMPLE IX

The general procedure of Example VIII was repeated, however, in this instance a copolymer of vinylidene chloride and vinyl chloride was dissolved in dioxane. The results were substantially identical to those obtained in Example VIII.

EXAMPLE X

The general procedure of Example VIII was repeated; however in this instance the polymer used was a copolymer of vinylidene chloride and ethyl acrylate. The polymer was dissolved in tetrahydrofuran to produce a solution containing 10% of polymer. The results obtained were substantially identical to those obtained in Example VIII.

EXAMPLE XI

The general procedure of Example X was repeated; however, in this instance a sheet of polyester film (ca. 1 mil thick) was used in place of the paperboard as backing for the laminate. The polyester film was coated with a thin layer (ca. 0.01 mil, dry thickness) or Hercoprime (an atactic polypropylene in an aromatic solvent) and the solvent was evaporated before applying the vinylidene chloride ethyl acrylate polymer solution. The resulting laminate was substantially nonpermeable to air and oxygen, including moisture-laden air and moisture-laden oxygen.

EXAMPLE XII

The general procedure of Example VIII was repeated. However, in this instance the substrate, or surface, on which the polymer solution was coated was a polished glass surface, and the layer, or film, or chromium treated bentonite clay was replaced by a layer, or film, consisting of platelets, or platelike particles, of aluminum. The layer of aluminum platelets was applied by forming an aqueous dispersion of about 2% of aluminum platelets in water, coating the previously formed dry polymer film, or layer, with said aqueous dispersion, drawing the resulting coating of aluminum filler down with a Baker Film Applicator Bar, and drying the thus drawn coating to form a film, or layer, of aluminum platelets about 0.03 mil thick. The thus formed film of aluminum platelets was then overcoated with two coatings of polymer solution using the general procedure of Example VIII.

The resulting laminate comprising a layer, or film, of aluminum platelets laminated, or bonded, between two layers, or films, of polymer was stripped from the glass surface. Said film was found to have a permeability to oxygen of less than $1 \times 10^{-12}$ cc. (s.t.p.) $\times$ cm./cm.$^2 \times$ sec. $\times$ atm. at 35° C.

EXAMPLE XIII

A dispersion of about 10% of platelets, or platelike particles, of N-benzoyl acetamide was prepared by adding said particles of N-benzoyl acetamide to water. The mixture was stirred vigorously for about 15 minutes, allowed to stand for about 5 minutes, and the resulting dispersion of suspended particles was decanted from a few large particles which had settled out. The thus obtained dispersion was labeled "Dispersion VIII."

A latex of a copolymer of vinylidene chloride and vinyl chloride having a solid content of about 40% was mixed with a sufficient quantity of the above-described "Dispersion XIII" to produce a composition, or slurry, containing about 12% N-benzoyl acetamide and 88% copolymer based on the solid content of said composition.

After thoroughly mixing the above-described composition, a quantity of it was applied as a first coating to a smooth glass surface. Said coating was drawn down, with a Baker Film Applicator Bar, to such thickness that, upon drying for about 4 minutes at about 110° C. it formed a film having a thickness of about 0.4 mil. A second coating of the aforesaid composition was applied to the aforesaid film using the same application, drawing, and drying procedure that was used with said first coating, thereby to produce a filled film having a thickness of about 0.8 mil laminated, or bonded, to the glass surface.

The film was stripped from the glass surface and tested for permeability to oxygen. Its permeability to oxygen was found to be less than $1 \times 10^{-12}$ cc. (s.t.p.) $\times$ cm./cm.$^2 \times$ sec. $\times$ atm. at 35° C.

EXAMPLE XIV

The general procedure of Example XIII was repeated; however, in this instance the dispersion of platelets of N-benzoyl acetamide was replaced with about a 9% dispersion of graphite platelets in water. The results were substantially identical to those obtained in Example VIII.

EXAMPLE XV

The general procedure of Example IV was repeated. However, in this instance a portion of Dispersion No. 1 was modified by adding thereto about 2%, based on the dry weight of the modified clay filler in said Dispersion No. 1, of polyvinyl methyl ether thereby to yield a modified dispersion (Dispersion No. 1-A). Dispersion No. 1-A was substituted, in the instant example, for the Dispersion No. 1 used in Example IV. The resulting laminate film was stripped from the metal surface (substrate). The permeability of this film to moist oxygen and humid air was less than $1 \times 10^{-12}$ cc. (s.t.p.) $\times$ cm./cm.$^2 \times$ sec. $\times$ atm. at 35° C.

It was found that incorporation of the polyvinyl methyl ether into the dispersion of modified clay from which the layer, or film, of filler was prepared rendered the laminate film of this example more flexible than the laminate film of Example IV. That is, bending the film prepared according to this example 180° around a ½-inch mandrel and flexing said film 10 times did not increase the permeability of said film to moist oxygen. An identical bending and flexing treatment greatly increased to moist oxygen permeability of the laminate film of Example IV.

EXAMPLE XVI

The general procedure of Example XV was repeated. However, in this instance the polyvinyl methyl ether of Example XV was replaced with about 2%, based on the dry weight of modified clay filler in Dispersion No. 1, of polyethylene oxide. The results obtained with the laminate film of the instant example were substantially identical to those obtained with the laminate film of Example XV. In other words, incorporation of polyethylene oxide into the modified clay filler rendered the laminate film of this example more flexible than the laminate film of Example IV.

EXAMPLE XVII

A suspension of about 2% bentonite clay in water at about 60° C. was agitated with rapid stirring and treated with sodium polyphosphate as a dispersing and exfoliating agent. About 0.5% sodium polyphosphate, based on the weight of the clay present, was added. When dispersion was substantially complete, after about 2 hours, stirring was discontinued and a small amount of larger unexfoliated clay particles and a few particles of rock, silica, and the like were allowed to settle out. The dispersion was decanted from the particles which had settled, thereby to obtain a dispersion of a purified clay-like material—purified bentonite clay. The purified bentonite clay was recovered from the dispersion by centrifugation and redispersed in water to give a dispersion containing about 8% of said clay; this dispersion was designated "Dispersion 8."

A latex (i.e., an aqueous dispersion) of a copolymer of vinylidene chloride and vinyl chloride having a solid content of about 40% was mixed with a sufficient quantity of the above-mentioned Dispersion 8 to produce a composition, or slurry, containing about 15% of said purified bentonite clay and 85% copolymer based on the solid content of the resulting slurry, or composition. After mixing the composition thoroughly, a quantity of it was applied as a first coating to a smooth glass surface and drawn down with a Baker Film Applicator. The coating was drawn to such thickness that, after drying at about 125° C. for about 3 minutes, a first layer of a filled polymer film having a thickness of about 0.5 mil resulted. A second coating of the aforesaid composition, of substantially the same thickness as the first coating, was applied to said first coating and dried using the same application, drawing, and drying procedure that was used with said first coating, thereby to fill pinholes in the first layer of polymer film and to produce a film having a total thickness of about 1 mil and consisting of a film of clay filled polymer laminated, or bonded to a substrate (the glass surface). This film was stripped from the glass surface.

The permeability of the dried transparent film to dry oxygen was measured and found to be less than $1 \times 10^{-12}$ cc. (s.t.p.) $\times$ cm./cm.$^2 \times$ sec. $\times$ atm. at 35° C. However, the permeability of said film to moist oxygen was only about $1 \times 10^{-1}$ cc. (s.t.p.) $\times$ cm./cm.$^2 \times$ sec. $\times$ atm. at 35° C.

The film prepared in the instant example was much more brittle than similar films prepared with modified clay (modified bentonite) fillers, e.g., in Examples I, II, and III. Brittleness is objectionable because if the film is fractured, e.g., by bending or flexing, its permeability is increased substantially.

EXAMPLE XVIII

The general procedure of Example V was repeated. However, in this instance the clay film was *not* modified (i.e., the clay film was *not* treated with a solution of chromium (III) sulfate). The resulting film was stripped from the surface on which it was formed, thereby to form a self-supporting laminate film. The permeability of this self-supporting laminate film to dry oxygen was less than $1 \times 10^{-12}$ cc. (s.t.p.) $\times$ cm./cm.$^2 \times$ sec. $\times$ atm. at 35° C. but the permeability of this film to moist oxygen (i.e., oxygen about 50–95% saturated with water vapor at about 35° C.) was about $1 \times 10^{-11}$ cc. (s.t.p.) $\times$ cm./cm.$^2 \times$ sec. $\times$ atm. at 35° C.

Permeabilities reported in the above examples, unless it is stated otherwise where permeability data are reported, were determined with moist or humid gases (i.e., gases which were about 50–95% saturated with water vapor at about 35° C.).

Where using platelike particles, or platelets, of at least one organic compound as filler in the process of my invention, such compound cannot be used with polymer systems containing solvents in which the particular platelike organic compound is soluble, and drying of films in which such organic compound is present must be conducted below the melting point of said platelike compound.

As used in the specification and claims of this application: (a) The term percent (%) means percent by weight unless otherwise defined where used; (b) The term cc. means cubic centimeters; (c) The term mil means 0.001 inch; (d) The term s.t.p. means "standard temperature and pressure" (i.e., one atmosphere and 0° C.); (e) The term atm. means atmosphere (i.e., 760 millimeters of mercury); (f) The term sec. means second; (g) The term cm. means centimeter; (h) The term cm.$^2$ means square centimeter; and (i) A. means Angstrom units.

What is claimed is:

1. A process for preparing a self-supporting film having a low permeability to gases comprising applying at least one coating of a polymer-diluent system consisting of dispersions or solutions of a film-forming polymer consisting essentially of a vinyl or vinylidene homopolymer or copolymer dissolved or dispersed in water or an organic solvent, said polymer-diluent system being filled with a mineral, inorganic, or organic material having a platelike structure, to a substrate, and, after applying such coating;
    (a) adjusting the thickness of the coating;
    (b) drying the coating to a solid state, whereby a film is formed, the film being laminated to the substrate; and
    (c) stripping the film from the substrate.

2. A process for preparing a self-supporting laminate having a low permeability to gases comprising applying at least one coating of a polymer-diluent system consisting of dispersions or solutions of a film-forming polymer consisting essentially of a vinyl or vinylidene homopolymer or copolymer dissolved or dispersed in water or an organic solvent, said polymer-diluent system being filled with a mineral, inorganic, or organic material having a platelike structure, to a substrate, and, after applying such coating;
    (a) adjusting the thickness of the coating;
    (b) drying the coating to a solid state, whereby a film is formed, the film being laminated to the substrate;
    (c) applying at least one coating of a polymer-diluent consisting of dispersions or solutions of a film-forming polymer consisting essentially of a vinyl or vinylidene homopolymer or copolymer dissolved or dispersed in water or an organic solvent to the aforesaid film, and, after applying such coating;
    (d) adjusting the thickness of said coating of film-forming polymer-diluent system;
    (e) drying said coating of film-forming polymer-diluent system to the solid state, whereby a second film is formed, said second film being laminated to the film prepared from the filled film-forming polymer-diluent system; and
    (f) stripping the substrate from the film to which the substrate is laminated.

3. A process for preparing a self-supporting laminate having a low permeability to gases comprising applying at least one coating of a polymer-diluent system consisting of dispersions or solutions of a film-forming polymer consisting essentially of a vinyl or vinylidene homopolymer or copolymer dissolved or dispersed in water or an organic solvent to a substrate, and, after applying such coating;
    (a) adjusting the thickness of the coating;
    (b) drying the coating to a solid state, whereby a first polymer film is formed, said film being laminated to the substrate;
    (c) applying a coating of a dispersion of a mineral, inorganic, or organic filler having a platelike structure to the film;
    (d) adjusting the thickness of the coating of filler;
    (e) drying the coating of filler to a substantially liquid free state, whereby a layer of filler is formed on the first polymer film, said layer of filler being on top of and laminated to the first polymer film;
    (f) applying at least one coating of a polymer-diluent system consisting of dispersions or solutions of a film-forming polymer consisting essentially of a vinyl or vinylidene homopolymer or copolymer dissolved or dispersed in water or an organic solvent to said layer of filler, and, after applying such coating;
    (g) adjusting the thickness of the coating of polymer-diluent system; and
    (h) drying said coating to the solid state, whereby a second polymer film is formed, said second polymer film being on top of and bonded to the layer of filler.

4. The process of claim 3 in which the substrate is stripped from the film to which the substrate is laminated.

5. The process of claim 3 in which about 0.5–15% based on the dry weight of the filler present, of polymeric additive selected from the group consisting of polyvinyl methyl ether and polyethylene oxide is incorporated into the dispersion of filler.

6. A process for preparing a self-supporting laminate having a low permeability to gases comprising applying at least one coating of a polymer-diluent system consisting of dispersions or solutions of a film-forming polymer consisting essentially of a vinyl or vinylidene homopolymer or copolymer dissolved or dispersed in water or an organic solvent to a substrate, and, after applying such coating;
    (a) adjusting the thickness of the coating;
    (b) drying the coating to a solid state, whereby a first polymer film is formed, said film being laminated to the substrate;
    (c) applying a coating of a dispersion of a purified clay-like mineral having a platelike structure to the first polymer film;
    (d) adjusting the thickness of the coating of clay-like mineral;
    (e) drying the coating of clay-like mineral to a substantially liquid free state, whereby a layer of clay-like mineral is formed on top of said first polymer film, said layer being laminated to said first polymer film;
    (f) applying a coating of a solution of at least one salt of at least one element selected from the group consisting of aluminum and a transition element having an atomic number of 21–32, 39–51, or 57–83 to said layer of clay-like mineral;

(g) allowing the coating of said solution to remain in contact with the mineral layer for about 5 seconds to about 10 minutes, to modify said mineral layer;

(h) washing said solution from the modified mineral layer;

(i) drying the modified mineral layer to a substantially liquid free state;

(j) applying at least one coating of a polymer-diluent system consisting of dispersions or solutions of a film-forming polymer consisting essentially of a vinyl or vinylidene homopolymer or copolymer dissolved or dispersed in water or an organic solvent to the washed and dried modified mineral layer, and, after applying such coating;

(k) adjusting the thickness of said coating of film-forming polymer-diluent system; and (l) drying said coating of film-forming polymer-diluent system to a solid state, whereby a second polymer film is formed, said second polymer film being on top of and laminated to the layer of modified clay-like mineral.

7. The process of claim 6 in which the substrate is stripped from the film to which the substrate is laminated.

8. The process of claim 6 in which about 0.5–15%, based on the dry weight of the purified clay-like mineral present, of a polymeric additive selected from the group consisting of polyvinyl methyl ether and polyethylene oxide is incorporated into the dispersion of clay-like mineral.

9. A process for preparing a self-supporting laminate having a low permeability to gases comprising applying at least one coating of a polymer-diluent system consisting of dispersions or solutions of a film-forming polymer consisting essentially of a vinyl or vinylidene homopolymer or copolymer dissolved or dispersed in water or an organic solvent to a substrate, and, after applying such coating;

(a) adjusting the thickness of the coating;

(b) drying the coating to a solid state, whereby a first polymer film is formed, said film being laminated to the substrate;

(c) applying at least one coating of a polymer-diluent system consisting of dispersions or solution of a film-forming polymer consisting essentially of a vinyl or vinylidene homopolymer or copolymer dissolved or dispersed in water or an organic solvent, said polymer-diluent system being filled with a mineral, inorganic, or organic material having a platelike structure, to said first polymer film, and, after applying such coating;

(d) adjusting the thickness of the coating of filled polymer-diluent system;

(e) drying the coating of filled polymer-diluent system to the solid state, whereby a film of filled polymer is formed, said filled polymer film being on top of and laminated to the aforesaid first polymer film;

(f) applying at least one coating of a polymer-diluent system consisting of dispersions or solutions of a film-forming polymer consisting essentially of a vinyl or vinylidene homopolymer or copolymer dissolved or dispersed in water or an organic solvent to the film of filled polymer, and, after applying such coating;

(g) adjusting the thickness of the coating of film-forming polymer-diluent system; and (h) drying the coating of polymer-diluent system to a solid state, whereby a second polymer film is formed, said second polymer film being on top of and laminated to the film of filled polymer.

10. The process of claim 9 in which the substrate is stripped from the film to which said substrate is laminated.

References Cited
UNITED STATES PATENTS

| | | | |
|---|---|---|---|
| 3,085,731 | 4/1963 | Wilkins | 117—76(P)X |
| 3,142,583 | 7/1964 | McMahon | 117—62 |
| 3,230,289 | 1/1966 | Eder et al. | 264—216 |
| 3,428,483 | 2/1969 | Owens | 117—138.8(A) |
| 3,498,827 | 3/1970 | Vanderbilt et al. | 117—75 |

WILLIAM D. MARTIN, Primary Examiner

R. HUSACK, Assistant Examiner

U.S. Cl. X.R.

117—62, 72, 75, 76, 102, 132, 135.1, 138.8, 161; 161—162; 264—41, 216